Jan. 30, 1968 A. L. McGEE 3,366,019
METHOD AND APPARATUS FOR MAKING A CONTAINER
Filed Oct. 20, 1965

3,366,019
METHOD AND APPARATUS FOR MAKING
A CONTAINER
Arthur L. McGee, San Jose, Calif., assignor to FMC Corporation, Philadelphia, Pa., a corporation of Delaware
Filed Oct. 20, 1965, Ser. No. 498,824
7 Claims. (Cl. 93—36.01)

The present invention relates to a method and apparatus for making reinforced plastic containers.

Foil-fiber cans have received wide acceptance in many areas, and particularly in the oil industry which requires a light weight, disposable and comparatively inexpensive container for oil consumer products. These cans generally have metal lids attached to the ends of a tubular body which consists of spirally wound inner and outer laminations of aluminum foil and kraft paper and a central layer of kraft board. Regardless of the care employed during manufacture, leakage often does occur along the spiral seams of foil-fiber cans, especially after such cans have undergone some jolting as might normally be expected during transit. While such cans are generally less expensive than all metal cans the foil-fiber cans do employ costly materials, such as aluminum lids, and must undergo a relatively large number of manipulative steps during fabrication and filling. Accordingly, a primary object of this invention is to provide an improved and more satisfactory reinforced plastic container and a method and apparatus for making the same.

Another object is the provision of an improved container having a continuous or unbroken and seamless plastic shell which is reinforced by and locked within a tubular sleeve without the use of adhesives.

Still another object is the provision of a container having a generally rigid tubular body or sleeve which imparts strength to the container and a seamless plastic shell which lines the inside wall of the tubular body and extends across one end and the adjacent edge thereof to form a container end wall.

A further object is the provision of an improved reinforced plastic container which is strong but light in weight, simple in construction, easily disposed of after use and is made of inexpensive materials.

A still further object is to provide an improved method and apparatus for making reinforced plastic containers in which a plastic shell is mechanically interlocked within a reinforcing sleeve.

A still further object is the provision of a simple method and apparatus for making a container having a seamless plastic shell which extends snugly along the inside walls and across one end of a reinforcing sleeve.

Still further objects will appear from the following description.

The novelty of the container of the present invention resides in the manner by which a seamless and continuous or unbroken plastic shell lines the inside wall of a generally rigid tubular supporting body or sleeve and forms a container end wall and is mechanically locked to the sleeve in a taut relationship. More particularly, the shell is snugly engaged with the inside wall of the reinforcing sleeve and, at its open end, is in the form of a lip which extends over and onto an adjacent edge of the sleeve. The closed end of this shell extends across the opposite end of the sleeve, so as to provide a container end wall and projects as a rim over and onto the edge of the reinforcing sleeve. As more fully described hereafter, during the incorporation of the shell within the reinforcing sleeve the portion of the shell lining the sleeve is caused to become taut. As a result, the lip and rim of the shell snugly hug the edges of the sleeve and thereby lock the shell in place within the sleeve. Advantage can also be taken of the shell lip in bonding a lid or cover to complete container closure and assure a fluid-tight and reliable seal.

In the practice of the method of the present invention, a sheet of thermoplastic material is disposed across one end of a reinforcing sleeve and is expanded into the sleeve and toward its opposite end as a continuous or unbroken seamless envelope. Preferably, but not necessarily, the sheet of thermoplastic material is preheated before being disposed across the one end of the sleeve, with additional heat being supplied during the expansion thereof.

This heat softened sheet is vacuum formed, preferably with a plug assist, as a continuous, seamless envelope which snugly engages the inside walls of the reinforcing sleeve, and during such forming is held firmly against the edge of the sleeve across which it is first disposed to provide an outwardly projecting lip thereat. During the forming operation, the vacuum is applied until the expanded envelope of thermoplastic material extends slightly beyond the opposite end of the reinforcing sleeve and projects over and against the adjacent edge thereof as a rim. This envelope thus provides a cover or end wall across the end of the reinforcing sleeve. It is preferred that the outwardly projecting portions of such envelope be pressed snugly up against the adjacent edge of the sleeve to laminate or unite overlying areas of the envelope into the form of a solid rim and, perhaps, to secure some bond to the sleeve itself.

The formed envelope of plastic is then cooled to provide a solid shell. Normally, this plastic envelope will undergo some slight shrinkage upon cooling which will render the resulting shell taut and maintain the portions thereof engaged with the edges of the sleeve firmly in place. As a result, the plastic shell is free of any crimps or folds and is snugly locked against movement relative to the reinforcing sleeve.

As is expected in vacuum forming operations, the thickness of the sheet of thermoplastic material is gradually reduced, with the portion thereof experiencing the greatest degree of expansion, in this case the portion of the expanded envelope forming the container end wall, being of thinnest section. It will be noted, however, that in laminating or uniting those portions of the expanded envelope which are engaged with the adjacent edge of the sleeve, the periphery of the container end wall is thicker than the remainder thereof and thus provides protection along the areas where the greatest loads and wear are likely to occur during use of the container.

Aside from a heated plug and clips for supporting a sheet of thermoplastic material across one end of the reinforcing sleeve, both of which may be of conventional construction, the apparatus of the present invention includes a vacuum chamber into which the opposite end of such sleeve is adapted to be received and sealed from the surrounding atmosphere. The vacuum chamber has a tubular side wall and an end wall and includes a pressure or laminating plate which is movable longitudinally thereof toward and away from the edge of the sleeve enclosed by the chamber.

During the forming operation the pressure plate is spaced from the adjacent sleeve edges so that the expanding sheet or envelope of thermoplastic material is drawn beyond the end of the sleeve and into contact with the pressure plate and over and against the adjacent edge of the sleeve. Evacuation is preferably effected through the chamber end wall, with the atmosphere being evacuated flowing through a small clearance provided between the periphery of the pressure plate and the adjacent inside surface of chamber side wall. With this arrangement localized pockets of entrapped gases is avoided and the desired contact of the envelope of thermoplastic material over and against the edge of the sleeve is assured. Suitable means are provided for moving the pressure plate toward the sleeve after the forming operation to thereby laminate or unite the overlying areas which extend over the sleeve edge into the form of a solid rim.

Support of the reinforcing sleeve with its enclosed end spaced from the pressure plate may be achieved externally, for example by a ring clamp fixed to the sleeve and engaged with the chamber. For the sake of rapid operation and to minimize manipulations, the edge of the sleeve is preferably engaged with the ends of a series of fixed pins which project from the chamber end wall. The pressure plate is shaped, of course, to accommodate such pins and is movable relative thereto. Such pins are preferably of smaller section than the wall thickness of the sleeve and are located to engage with areas of the sleeve edge nearest to its outside surface. In the finished container, the areas occupied by the supporting pins appear as small indentations along the rim of the plastic shell and involve no sacrifice in the integrity of the shell or the container itself.

As heretofore noted the heated plug is of conventional construction and may be equipped with a ring which is designed to clamp the sheet of thermoplastic material against the adjacent edge of the sleeve after the plug has been projected against the sheet and at least partially into such sleeve. If desired, means other than a plug-supported ring such as an annular clamp plate, may be employed for this purpose.

The initial size of the sheet of thermoplastic material may be of substantially the same size or larger than the transverse cross-section of the reinforcing sleeve. In the latter instance trimming will usually be required after the lining operation to remove portions of the sheet which extend beyond the outside periphery of the sleeve.

If desired the lined container of the present invention may be filled and covered before being removed from the forming apparatus. In this instance the lip of the plastic shell and/or an applied lid may be heated to effect a desired fluid-tight bond.

As heretofore mentioned the tubular supporting shell is of generally rigid construction and may be formed of plastic, metal or laminated layers of fibrous materials.

The container shell may be formed of any suitable thermoplastic material which can be heated to its forming temperature without causing damage to the sleeve or subsequently applied container lid. Polyethylene and polypropylene films, for example, are satisfactory.

For the sake of simplicity, the method of the present invention is hereafter described as employed in making a container having a tubular reinforcing body or sleeve formed of laminated fibrous materials and a seamless and continuous or unbroken shell formed of polypropylene.

In the drawing:

FIGURE 2 is a fragmentary section of a portion of the apparatus shown in FIGURE 1 on an enlarged scale;

Figure 1:
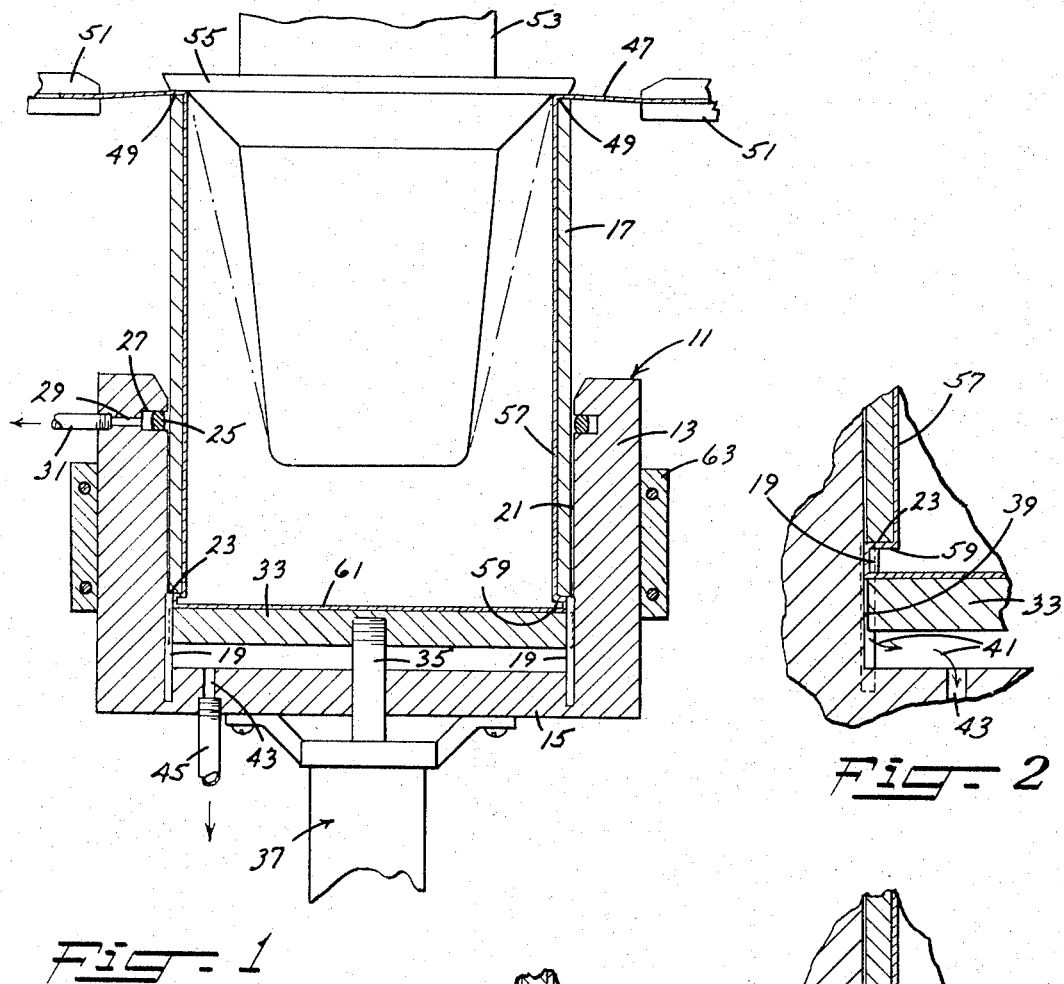
FIGURE 1 is a vertical section through a vacuum forming apparatus illustrating the manner by which a shell of plastic material is incorporated into a rigid supporting sleeve.

With reference to the drawing, the apparatus of the present invention includes a vacuum chamber 11 having a tubular wall 13 and an end wall 15. One end portion of a reinforcing sleeve 17, formed of laminated layers of fibrous material, is received snugly within the chamber 11 and is supported on the ends of a series of small pins 19 fixed to and projecting from the chamber end wall 15. As illustrated the pins 19 are positioned against the inside surface 21 of the chamber wall 13 and are each of a smaller cross-section than the wall thickness of the sleeve so as to engage with small areas of the sleeve edge 23 adjacent to its outside surface. Generally, two to six equally spaced pins will adequately support the sleeve 17.

An elastic sealing ring 25, such as a conventional O-ring, is seated within a groove 27 formed along the inside surface of the chamber wall 13. To assure a tight seal the inside surface of the ring 25, in its relaxed condition, presents an opening which is slightly smaller than the outside configuration of the sleeve 17. Thus, during insertion of the sleeve 17 into the chamber 11, the ring 25 is expanded by a vacuum applied to the groove 27 through a passage 29 and conduit 31.

Within the chamber 11 is positioned a pressure or laminating plate 33 which is carried by a piston rod 35 of a conventional hydraulic lift 37 for movement toward and away from the end of the sleeve 17, as hereafter described. The periphery of the plate 33 is shaped to accommodate the pins 19 and is spaced from the inside surface of the chamber wall 13 as well as the surfaces of the pins 19. This clearance provides a continuous passage 39 through which gases may flow, as indicated by arrows 41, when a vacuum is applied through an opening 43 and conduit 45 in the chamber end wall 15. It will, of course, be understood that a suitable seal, not shown, is provided around the rod 35 to avoid leakage in that area.

A sheet of thermoplastic material 47, such as polypropylene, is supported across the exposed end of the sleeve 17 and against its edge 49 by clips 51, and is at least initially expanded into the sleeve by a conventional heated plug 53. A ring 55 is fixed to the plug 53 and shaped to press or clamp the sheet 47 snugly against the edge 49 of the sleeve 17 as the plug completes its assisting function.

In the practice of the method of the present invention with the apparatus described above, a vacuum is applied to the groove 27 through the passage 29 and conduit 31 to expand the ring 25, after which the sleeve 17 is inserted into the chamber 11 with its edge 23 resting upon the pins 19. Air is permitted to enter the groove 27 thereby allowing the ring 25 to relax and snugly engage with the outside surface of the sleeve 17.

The sheet 47 of polypropylene, preferably heated in a separate oven to its forming temperature of about 300° F., is held by clips 47 across the exposed end of the sleeve 17 and against its edge 49, and then expanded into the sleeve, as shown by broken lines in FIGURE 1, by the heated plug 53. As the plug 53 assumes its terminal position, the underside of the ring 55 clamps the sheet 47 snugly against the edge 49 of the sleeve 17.

With the pressure plate 33 in a position as shown in FIGURE 1, the atmosphere below the partially expanded sheet 47 flows through the passage 39 as the chamber is evacuated through the opening 43 and conduit 45. The sheet 47 is thus further expanded as a continuous and seamless envelope which is progressively drawn tightly against the inside surface of the sleeve 17, as shown at 57, and over onto the sleeve edge 23, as shown at 59. With continued evacuation of the chamber 11, this envelope is engaged with the top face of the plate 33 and the portions of the inside surface of the wall 13 and pins 19 which are exposed or located above the plate 33 to form a container bottom wall 61. It will be noted that the continuity and location of passage 39 eliminates any tendency for pockets of gases to be trapped beneath the envelope of thermoplastic material and facilitates the flow of the envelope into the small space between the edge 23 of the sleeve 17 and the plate 33. To maintain the sheet 47 at its forming temperature and further assure the desired flow as it is expanded about the edge 23 of the sleeve 17, it is preferred that the chamber 11 be heated, as by band heaters 63.

Figure 4:
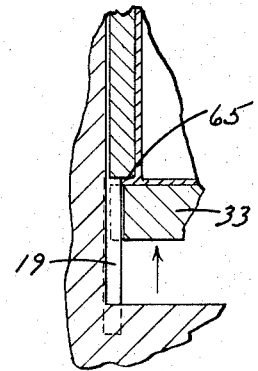
FIGURE 4 is a fragmentary section, on an enlarged scale, illustrating a portion of the apparatus of FIGURE 1 during a final stage of the method of the present invention.
Figure 3:
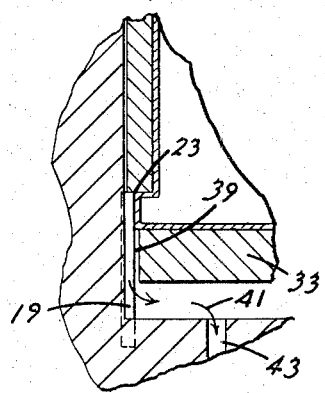
FIGURE 3 is a view similar to FIGURE 2 and through another portion of the apparatus shown in FIGURE 1.

After the sheet 47 has been expanded into an envelope as shown in FIGURE 1, the pressure plate 33 is elevated into its position illustrated in FIGURE 4. This causes a portion of the end wall 61 and the overlying portion 59 of the expanded envelope which is engaged with the sleeve edge 23 to be laminated into the form of a solid rim as indicated at 65. The sleeve 17 and expanded envelope are now cooled to provide a solid plastic shell. During this stage the envelope will undergo a slight amount of shrinkage which serves to draw the shell rim 65 snugly up against the sleeve edge 23. With the plug 53 removed, the portions of the original sheet extending beyond the outside surface of the sleeve 17 are trimmed away leaving a lip 57 to which a top lid may be bonded.

It will be apparent that in the finished container the snug engagement of the rim 65 and lip 67 of the plastic shell with the opposite edges of the sleeve 17 prevent movement of the shell longitudinally of the sleeve, and as a practical matter will prevent any movement of the shell. The plastic shell presents a smooth seamless and continuous or unbroken surface which is free of crimps or folds and, as shown in FIGURE 1, is supported along all side areas thereof.

Figure 5:
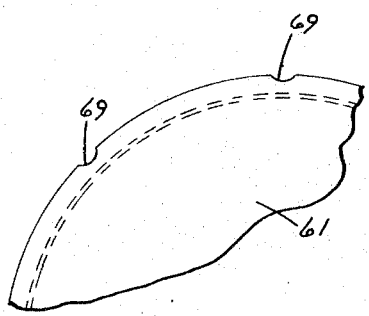
FIGURE 5 is a bottom view of a portion of a container of the present invention.

With reference to FIGURE 5, it will be noted that the areas of the edge 23 of the sleeve 17 occupied by the pins 19 during the forming operation provide the container bottom wall with small indentations 69 which do not detract from the appearance or integrity of the container. While the top face of the pressure plate 33 has been illustrated as being flat, it can, of course, be of convex or concave construction and may be provided with a design or indicia which would be impressed in the container end wall.

It is to be understood that changes and variations may be made without departing from the spirit and scope of the present invention.

I claim:

1. A method of making containers including the steps of disposing a sheet of thermoplastic material across one end of a generally rigid sleeve, softening and expanding said sheet which engages with the inside surface of said sleeve and as a seamless, continuous envelope extends beyond the opposite end thereof and projects outwardly into contact with the adjacent edge of said sleeve, holding the sheet snugly against the edge of said sleeve adjacent to said one end of said sleeve during the expansion thereof, pressing the outwardly projecting portions of said envelope against the edge of said sleeve which is adjacent to said opposite end thereof to laminate the same into a rim, and cooling said envelope to provide a solid plastic shell.

2. A method as defined in claim 1 wherein said envelope is expanded to extend outwardly over the edge of said sleeve adjacent to said opposite end thereof and into contact with inside surfaces of a surrounding chamber.

3. A method as defined in claim 2 wherein the portion expanded outwardly beyond said opposite end of said shell engages with the inside surface of an annular wall of said chamber and a laminating plate extending across said opposite end of said sleeve and spaced therefrom, and wherein said projecting portions of said envelope are laminated by moving said laminating plate toward said sleeve.

4. A method as defined in claim 3 wherein said heated sheet of thermoplastic material is expanded initially by a heated plug and subsequently expanded into its final shape by evacuation of the atmosphere from within said chamber.

5. In an apparatus for use in making containers wherein a sheet of thermoplastic material is disposed across one end of a sleeve and urged therein as an expanded envelope by a heated plug, a chamber for enclosing the opposite end of the sleeve, means providing a fluid-tight seal between the sleeve and said housing, a laminating plate positioned within said chamber, means supporting said opposite end of said sleeve in spaced relationship with said plate, means for evacuating the atmosphere from within said chamber to thereby further expand the sheet of thermoplastic material as an envelope outwardly beyond said opposite end of the sleeve and against said plate, and means for moving said plate toward said opposite end of the sleeve to press portions of the expanded envelope of thermoplastic material against the adjacent edge of the sleeve adjacent thereto.

6. An apparatus as defined in claim 5 wherein the sleeve is supported on the ends of a series of pins located within said chamber.

7. An apparatus as defined in claim 5 wherein the atmosphere is evacuated from said chamber through a continuous passage located between the periphery of said plate and inside surfaces of said chamber.

References Cited

UNITED STATES PATENTS 2,736,065   2/1956   Wilcox.
3,172,159   3/1965   Edwards.
3,195,425   7/1965   Taggart.

BERNARD STICKNEY, *Primary Examiner.*